July 11, 1933.  M. ARIMOTO  1,917,483
PROCESS OF ICE CREAM MAKING
Filed May 16, 1929
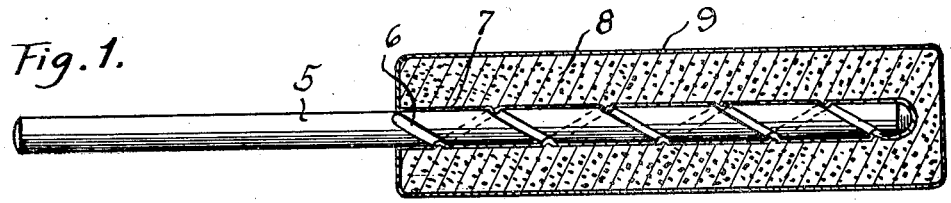
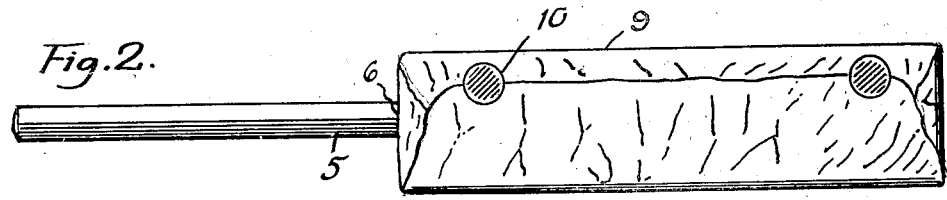
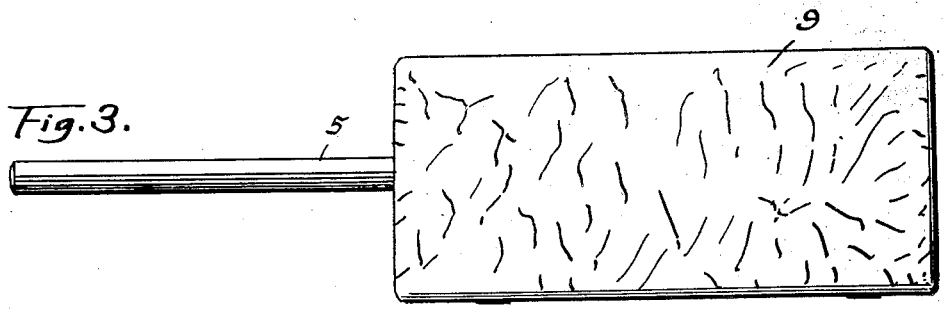
INVENTOR:
MASAZO ARIMOTO.
BY ATTY:

Patented July 11, 1933

1,917,483

UNITED STATES PATENT OFFICE

MASAZO ARIMOTO, OF SAN BERNARDINO, CALIFORNIA

PROCESS OF ICE CREAM MAKING

Application filed May 16, 1929. Serial No. 363,468.

This invention relates to a process of ice cream making, and its objects are to make up the ice cream in commercial form, whereby the same may be handled by the purchaser or consumer in a sanitary manner, and with a minimum soiling of the hands.

Another object of the invention is to provide a highly efficient process for affixing handle members to frozen confections whereby to insure a frozen union of the sticks and confections, prevent accidental separation of sticks and confections in the handling of the finished products, and simplify and improve the process and apparatus required.

To accomplish the objects of the invention, I mold the ice cream into a number of small bricks, provide the bricks with a handle, and wrap the bricks with a suitable prepared paper often used on confections.

The drawing illustrates a preferred form of the brick of ice cream, produced by my improved process, and embodying the features of this invention.

In the drawing: Figure 1 is a longitudinal and sectional view of my improved ice cream brick. Fig. 2 is a side elevation thereof. Fig. 3 is a top plan view of the brick. Fig. 4 is a detail view of a modified form of the handle.

Referring to the drawing in detail, the handle 5, consists preferably of wood, and has one portion provided with a groove 6, which will serve to retain the brick thereon. The grooved portion is covered with a coat of animal gelatin 7, and has thereon, the ice cream 8, which is covered with prepared paper 9, such as may be used on confections. The paper wrapper is sealed with the seals 10.

In the modified form of handle, the shaft 11 has a pointed end 12, which is adapted to be covered with the animal gelatin. Any suitable material may be used as the equivalent of the paper 9, and any suitable handle may be considered the equivalent of handles 5 or 11.

The process of making ice cream bricks in accordance with the present invention, consists in first taking a quantity of condensed milk (two quarts), preferably a condensed milk sold under the trade name of "Alpine Brand", and add thereto a fruit extract, one ounce, and sugar, two pounds. To the above-named ingredients, I add suitable fruit flavor and fruit juice. I then prepare a gelatin solution, consisting of animal gelatin, one-half ounce, and hot water to saturate the same, and I then mix all of the above ingredients, and add thereto three gallons of water. I then divide and place this mixture in small molds, and cool the molds with ice or suitable means. I then prepare the handles by dipping them in a solution of the gelatin, whereby a thin coat will be deposited on each handle, leaving one end thereof free from the gelatin. Then, as the cream solution is about to solidify, I place a handle in each mold whereby the coated portion is within the brick of cream. When the cream has solidified, I remove the same from the molds, and each brick thus formed, will have a handle free from any sticky substance. The final step of this process consists in wrapping each brick with a suitable wrapper, using preferably, a paper fabric cover.

The ingredients may be varied in quantity, and one or more may be omitted, or equivalents thereof may be substituted, without voiding the steps of the process. However, any formula for the cream will include the animal gelatin, and the handles will be coated therewith and inserted in each brick, as set forth.

The above process results in a product that is attractive, sanitary, and convenient to handle in use. Thus it is apparent that the present invention is characterized by the process which includes the improved step of causing the gelatinized handle to be frozen into the confection concurrently with the freezing of the confection.

I claim:

1. The process herein set forth, consisting of preparing a cream solution with a gelatin ingredient therein, placing a cream solution in suitable molds, in cooling the molds whereby to solidify the cream solution, in coating the handles with a gelatin substance, in inserting the handles, one in each mold, as the solution is about to solidify, in removing the solidified bricks from the molds, and finally in wrapping each brick with a paper fabric cover.

2. The process herein set forth, consisting of preparing a cream solution with a gelatin ingredient therein, placing a cream solution in suitable molds, in cooling the molds, whereby to solidify the cream solution, in coating the handles with a gelatin substance, in inserting the handles, one in each mold, as the cream solution is about to solidify, in removing the solidified bricks from the molds, and finally encasing each brick in a wrapper.

3. The process herein set forth, consisting in preparing a cream solution with a gelatin ingredient therein, in placing the solution in suitable molds, in cooling the molds whereby to solidify the solution therein, in coating handle elements with a gelatin solution, in inserting the handles, one in each mold, as the cream solution is about to solidify, in removing the solidified bricks from the molds, and finally in wrapping each brick with a paper fabric wrapper.

4. The process herein set forth, consisting of preparing a cream solution, in preparing an animal gelatin solution, in mixing the cream solution with a portion of the gelatin solution, in placing the cream solution in suitable molds whereby to solidify the same, in preparing handles, in coating the handles with the gelatin solution, in inserting the handles, one in each mold, as the cream solution is about to solidify, in removing the solidified bricks from the molds, and finally in covering each brick with a suitable wrapper.

5. The process of affixing a handle member to a confection which consists in coating at least a part of a handle member with gelatin, bringing together the coated portion of the handle member and a confection solution to be frozen, then freezing the coated portion of the handle member into the solution concurrently with the freezing of the solution.

6. The process of affixing a handle member to a confection which consists in coating at least a part of a handle member with gelatin, bringing together the coated portion of the handle and a gelatin containing confection solution which latter is to be frozen, then freezing the gelatinized portion of the handle into the solution concurrently with the freezing of the solution.

7. The process of affixing a handle member to a confection which consists in coating at least a part of a handle member with gelatin, immersing the coated part of the handle member in a confection solution to be frozen, and freezing the solution while the handle member is thus immersed therein until a frozen union of said coated part and the solution takes place.

In testimony whereof, I hereunto affix my signature.

MASAZO ARIMOTO.